(12) United States Patent
Liang et al.

(10) Patent No.: US 11,490,497 B1
(45) Date of Patent: Nov. 1, 2022

(54) KEYBOARD DEVICE WITH ELECTROSTATIC DISCHARGE PROTECTION FUNCTION

(71) Applicant: Primax Electronics Ltd., Taipei (TW)

(72) Inventors: Ying-En Liang, Taipei (TW); Zhen Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/561,272

(22) Filed: Dec. 23, 2021

(30) Foreign Application Priority Data

Nov. 26, 2021 (CN) .......................... 202111419862.4

(51) Int. Cl.
*H01H 13/14* (2006.01)
*H05F 3/04* (2006.01)
*H01H 13/70* (2006.01)
*H01H 13/20* (2006.01)

(52) U.S. Cl.
CPC .............. *H05F 3/04* (2013.01); *H01H 13/14* (2013.01); *H01H 13/20* (2013.01); *H01H 13/70* (2013.01)

(58) Field of Classification Search
CPC ...... H01H 3/125; H01H 13/705; H01H 13/14; H01H 13/20; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507
See application file for complete search history.

(56) References Cited

U.S. PATENT DOCUMENTS

| 6,580,043 B1 * | 6/2003 | Spratte | H01H 13/702 200/313 |
| 2011/0000775 A1 * | 1/2011 | Itou | H01H 13/705 200/520 |
| 2012/0298491 A1 * | 11/2012 | Ozias | H01H 13/023 200/314 |
| 2021/0210293 A1 * | 7/2021 | Yen | G06F 3/0221 |

* cited by examiner

*Primary Examiner* — Ahmed M Saeed
(74) *Attorney, Agent, or Firm* — Kirton McConkie; Evan R. Witt

(57) ABSTRACT

A keyboard device includes a casing, a circuit board, plural keys and an electrostatic conduction module. The circuit board is disposed within the casing. The circuit board includes a ground terminal. The plural keys installed in the corresponding key slots of the casing. The electrostatic conduction module includes a first conductive element, an elastic conductive element and a second conductive element. The first conductive element is installed on a keycap of the key. The elastic conductive element is disposed within the casing and contacted with the circuit board. The second conductive element is connected between the first conductive element and the elastic conductive element. Moreover, electrostatic charges on the keycap are transferred to the circuit board through the first conductive element, the second conductive element and the elastic conductive element and discharged from the ground terminal of the circuit board.

9 Claims, 5 Drawing Sheets

KEYBOARD DEVICE WITH ELECTROSTATIC DISCHARGE PROTECTION FUNCTION

FIELD OF THE INVENTION

The present invention relates to the structure of an input device, and more particularly to a keyboard device.

BACKGROUND OF THE INVENTION

In modern societies, electronic products become indispensable parts in human lives. The electronic products are applied in many sectors, including food, clothing, housing, transportation, education and entertainment. Generally, the electronic product is equipped with a keyboard for facilitating the user to input control signals.

During the process of fabricating or using the keyboard device, electrostatic charges are usually generated. The electrostatic discharge (ESD) effect may result in damage of the electronic components within the keyboard device. For avoiding the ESD effect, a membrane switch structure with an electrostatic discharge protection function is disclosed in U.S. Pat. No. 6,323,445B1, and a key and a keyboard device with an electrostatic discharge protection function are disclosed in Taiwanese Patent Publication No. TWI578350. For example, a circuit board of the keyboard device comprises an upper film layer, a lower film layer, an intermediate layer, a first conductive layer and a second conductive layer that can transfer and discharge electrostatic charges.

As mentioned above, the conventional technologies are aimed at the design of discharging the electrostatic charges from the inner portion of the device. However, the sources of the electrostatic charges are not restricted to the inner portion of the keyboard device. For example, when the key is pressed down by the user, electrostatic charges are gradually accumulated on the user's finger. Once the ESD effect occurs, the electronic components within the keyboard device are possibly damaged by the ESD effect through the depressed key. Under this circumstance, the keyboard device cannot be operated normally, or even the electronic device connected with the keyboard device is damaged.

Therefore, there is a need of providing a keyboard device capable of quickly and immediately discharging the electrostatic charges from key in order to overcome the drawbacks of the conventional technologies.

SUMMARY OF THE INVENTION

The present invention provides a keyboard device with an electrostatic discharge protection function. While the key is pressed by the user, the electrostatic charges on the user's finger can be discharged quickly. Since the keyboard device and the electronic device connected with the keyboard device can be effectively protected, the electronic components within the keyboard device and the electronic device will not be damaged by the electrostatic charges.

In accordance with an aspect of the present invention, a keyboard device with an electrostatic discharge protection function is provided. The keyboard device includes a casing, a circuit board, plural keys and at least one electrostatic conduction module. The casing includes plural key slots. The circuit board is disposed within the casing. The circuit board includes a ground terminal. The plural keys installed in the corresponding key slots, respectively, wherein each key comprises a keycap and a supporting element, and the keycap is installed on the supporting element. Each electrostatic conduction module includes a first conductive element, an elastic conductive element and a second conductive element. The first conductive element is installed on the keycap. The elastic conductive element is disposed within the casing and contacted with the circuit board. The second conductive element is connected between the first conductive element and the elastic conductive element. The first conductive element is linked with the keycap. The first conductive element is moveably connected with an end of the second conductive element away from the elastic conductive element. Moreover, electrostatic charges on the keycap are transferred to the circuit board through the first conductive element, the second conductive element and the elastic conductive element and discharged from the ground terminal of the circuit board.

In an embodiment, the first conductive element is a metal lid that is combined with the corresponding keycap, or the first conductive element is a metallic coating that is formed on a surface of the corresponding keycap.

In an embodiment, the elastic conductive element includes a first fixing segment and an elastic extension segment, and the elastic extension segment is connected with the first fixing segment, wherein the first fixing segment is fixed on an inner side of the casing, and the elastic extension segment is contacted with a surface of the circuit board.

In an embodiment, the second conductive element includes a second fixing segment and a vertical metal segment, and the vertical metal segment is connected with the second fixing segment. The vertical metal segment is flexible. The second fixing segment is combined with the first fixing segment of the elastic conductive element.

In an embodiment, the first conductive element includes a conductive rib. The conductive rib is installed on a lateral side of a skirt part of the keycap. The conductive rib is connected with an end of the vertical metal segment away from the first fixing segment.

In an embodiment, the second conductive element is a metallic spring, and a first end of the metallic spring is fixed on a surface of the first fixing segment.

In an embodiment, the first conductive element includes a conductive rib. The conductive rib is installed on a lateral side of a skirt part of the keycap. The conductive rib is connected with a second end of the metallic spring away from the first fixing segment.

In an embodiment, a power wire is connected with the ground terminal of the circuit board, and the ground terminal is connected to a computer device through the power wire.

In an embodiment, the circuit board is a power supply circuit board, a switching circuit board, a backlight circuit board, or a combination thereof.

From the above descriptions, the present invention provides a keyboard device with an electrostatic discharge protection function. The electrostatic charges on the users' finger or the key can be immediately discharged through the electrostatic conduction module. Due to this structural design, the keyboard device and the electronic device connected with the keyboard device can be effectively protected. Consequently, the electronic components within the keyboard device and the electronic device will not be damaged by the electrostatic charges.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
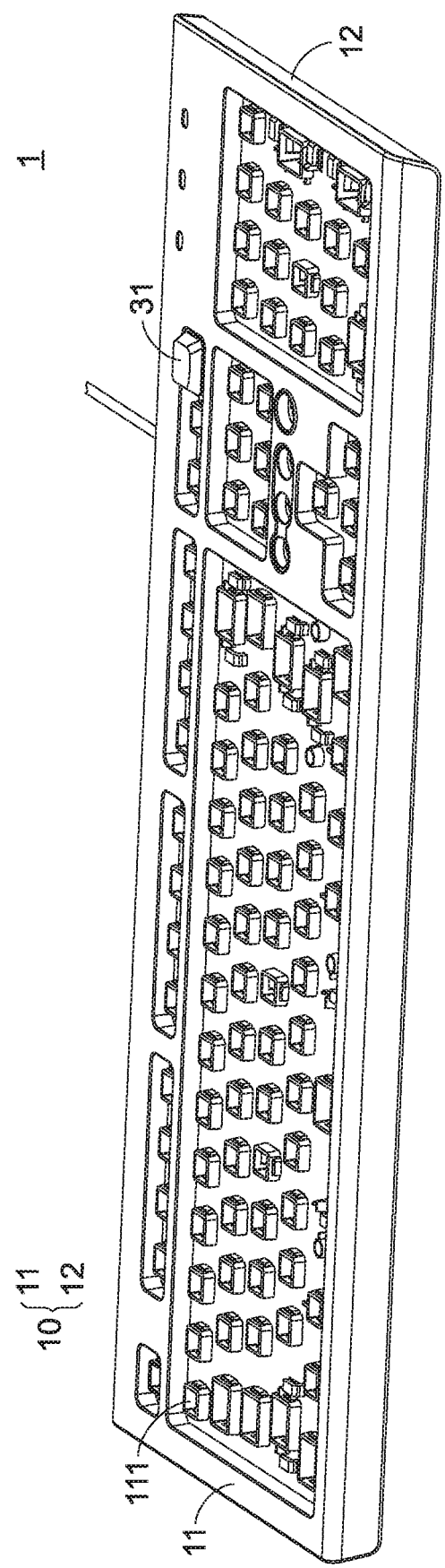
FIG. 1A is a schematic perspective view illustrating a keyboard device with an electrostatic discharge protection function according to the present invention.
Figure 1B:
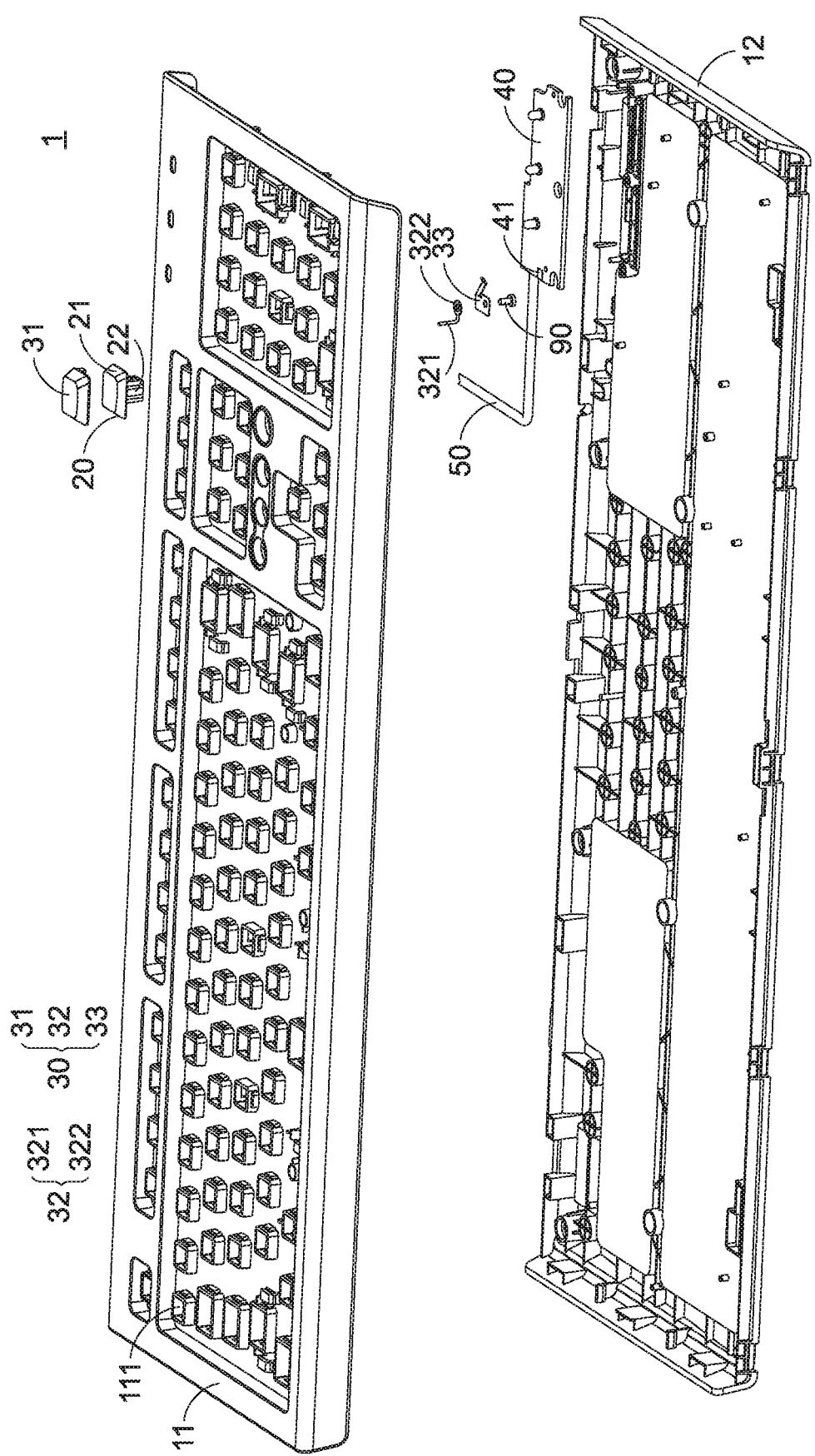
FIG. 1B is a schematic exploded view illustrating the keyboard device as shown in FIG. 1A and taken along a viewpoint.

FIG. 1A is a schematic perspective view illustrating a keyboard device with an electrostatic discharge protection function according to the present invention. FIG. 1B is a schematic exploded view illustrating the keyboard device as shown in FIG. 1A and taken along a viewpoint. As shown in FIGS. 1A and 1B, the keyboard device 1 comprises a casing 10, at least one key 20, an electrostatic conduction module 30, a circuit board 40 and a power wire 50.

The casing 10 comprises an upper cover 11 and a lower cover 12. After the upper cover 11 and a lower cover 12 are combined together, an accommodation space is defined for accommodating electronic components. The upper cover 11 comprises plural key slots 111. The key 20 is installed in the corresponding key slot 111. For succinctness, only one key 20 is shown in FIG. 1B. In practice, the keyboard device 1 comprises plural keys 20, and the plural keys 20 are installed in the corresponding key slots 111.

In an embodiment, each key 20 comprises a keycap 21 and a supporting element 22. The keycap 21 is installed on the supporting element 22. The supporting element 22 is penetrated through the corresponding key slot 111. In this embodiment, the supporting element 22 is the supporting element for the general mechanical key. It is noted that the example of the supporting element 22 is not restricted. For example, in another embodiment, the supporting element 22 includes a scissors-type supporting element, a V-shaped linkage rod, an A-shaped linkage rod or two parallel linkage rods.

The circuit board 40 is disposed within the casing 10. In addition, the circuit board 40 comprises a ground terminal 41. A first terminal of the power wire 50 is connected to the ground terminal 41. A second terminal of the power wire 50 is connected to an external computing device. The computer device can provide electric power to the keyboard device 1 through the power wire 50. In addition, the key signal can be transmitted from the keyboard device 1 to the computing device 1 through the power wire 50. Preferably but not exclusively, the circuit board 40 is a power supply circuit board, a switching circuit board, a backlight circuit board, or a combination thereof.

Figure 2:
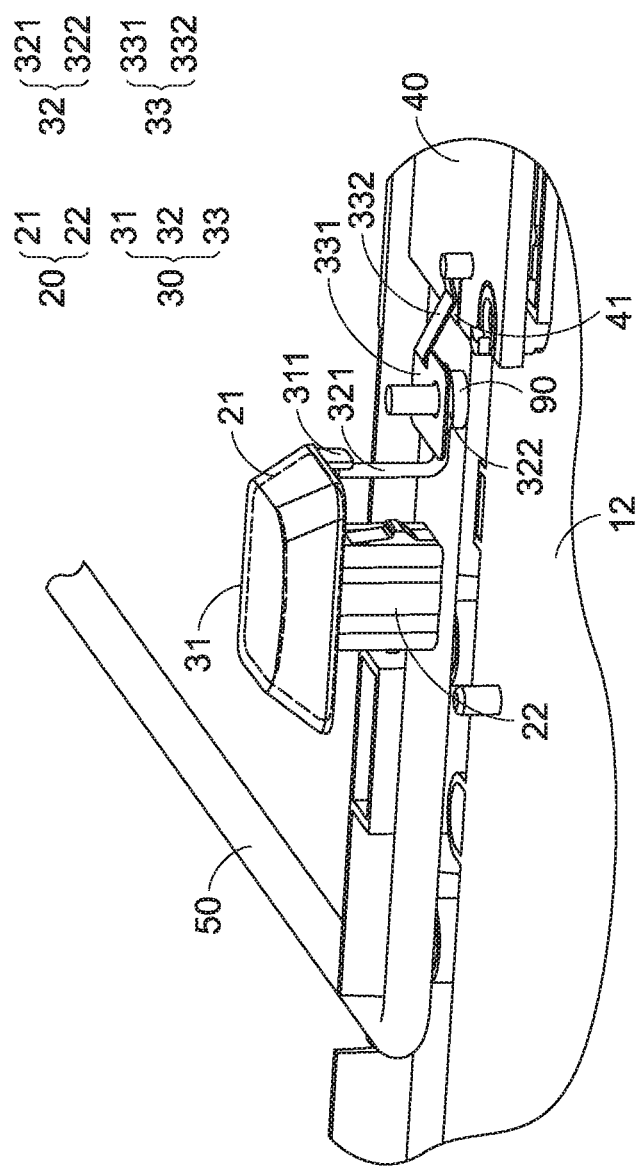
FIG. 2 is a schematic perspective view illustrating the structure of the electrostatic conduction module of the keyboard device according to a first embodiment of the present invention.

FIG. 2 is a schematic perspective view illustrating the structure of the electrostatic conduction module of the keyboard device according to a first embodiment of the present invention. Please refer to FIGS. 1B and 2. The electrostatic conduction module 30 comprises a first conductive element 31, a second conductive element 32 and an elastic conductive element 33. The first conductive element 31 is installed on the keycap 21. The elastic conductive element 33 is disposed within the casing 10 and contacted with the circuit board 40. The second conductive element 32 is connected between the first conductive element 31 and the elastic conductive element 33.

In an embodiment, the first conductive element 31 is a metal lid, and the metal lid is combined with the corresponding keycap 21. The first conductive element 31 comprises a conductive rib 311. The conductive rib 311 is installed on a lateral side of a skirt part of the keycap 21 and protruded downwardly.

The elastic conductive element 33 comprises a first fixing segment 331 and an elastic extension segment 332. The elastic extension segment 332 is connected with the first fixing segment 331.

The second conductive element 32 comprises a second fixing segment 322 and a vertical metal segment 321. The vertical metal segment 321 is connected with the second fixing segment 322. The vertical metal segment 321 is located beside the supporting element 22 of the key 22 and inserted into the corresponding key slot 111. In addition, the vertical metal segment 321 is flexible.

As mentioned above, the first conductive element 31 of this embodiment is a metal lid. It is noted that the example of the first conductive element 31 is not restricted. For example, in another embodiment, the first conductive element 31 is a metallic coating that is formed on the entire or a portion of the surface of the keycap 21.

Please refer to FIG. 2 again. The second fixing segment 322 of the second conductive element 32 is installed on a top side or a bottom side of the first fixing segment 331 of the elastic conductive element 33. In addition, the second fixing segment 322 of the second conductive element 32 is combined with the first fixing segment 331 of the elastic conductive element 33. For example, after the second fixing segment 322 and the first fixing segment 331 are stacked on each other, the first fixing segment 331 and the second fixing segment 322 are fixed on the inner side of the upper cover 11 (see FIG. 1B) through a fastening element 90 (e.g., a screw). The elastic extension segment 332 of the elastic conductive element 33 is contacted with the surface of the circuit board 40. A first end of the vertical metal segment 321 is connected with the second fixing segment 322. A second end of the vertical metal segment 321 is away from the first fixing segment 331. The conductive rib 311 of the first conductive element 31 is connected with the second end of the vertical metal segment 321. For example, the vertical metal segment 321 and the conductive rib 311 are connected with each other through a spot welding means or an adhering means.

As mentioned above, the vertical metal segment 321 is flexible. Consequently, while the keycap 21 is pressed down in response to an external force and the first conductive element 31 is correspondingly moved with the keycap 21, the vertical metal segment 321 is dragged by the conductive rib 311 and subjected to deformation. When the external force is no longer applied to the keycap 21, the first conductive element 31 and the keycap 21 are moved upwardly and returned to their original positions. Since the vertical metal segment 321 is pulled by the conductive rib 311, the vertical metal segment 321 is restored to the original upright state.

Figure 3:
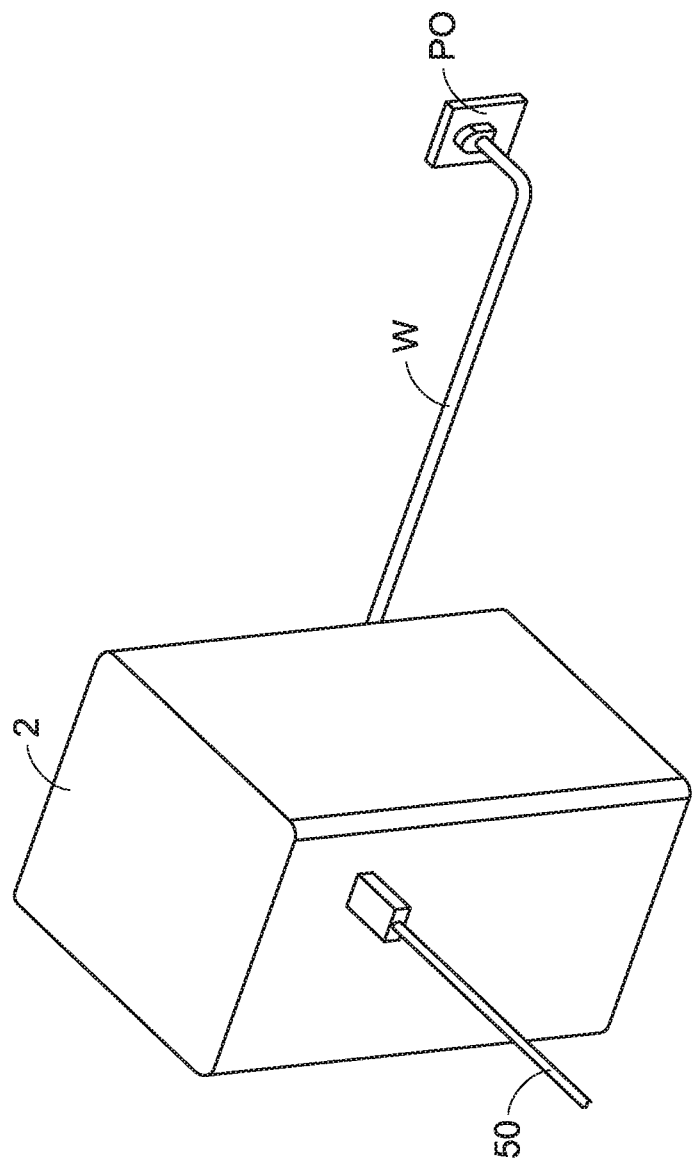
FIG. 3 schematically the path of discharging electrostatic charges through the electrostatic conduction module of the keyboard device according to the present invention.

Please refer to FIGS. 2 and 3. FIG. 3 schematically the path of discharging electrostatic charges through the electrostatic conduction module of the keyboard device according to the present invention. In case that electrostatic charges are accumulated on the user's finger and the keycap 21 (see FIG. 2) is pressed down by the user's finger, the electrostatic charges are transferred to the circuit board 40 through the first conductive element 31, the second conductive element 32 and the elastic conductive element 33, and the electrostatic charges are discharged from the ground terminal 41 of the circuit board 40.

As mentioned above, the first terminal of the power wire 50 is connected to the ground terminal 41, and the second terminal of the power wire 50 is connected to the computing device 2. Moreover, the computing device 2 is connected with a power socket PO through a main power cable W. After the electrostatic charges are transferred to the circuit board 40, the electrostatic charges are transferred to the computing device 2 through the ground terminal 41 and the power wire 50. Then, the electrostatic charges are transferred to the ground hole (not shown) of the power socket PO through the main power cable W of the computing device 2 and discharged to the ground.

It is noted that numerous modifications and alterations may be made while retaining the teachings of the invention. For example, in another embodiment, a ground wire or a conducting element is connected with the ground terminal 41 of the circuit board 40, and the ground wire or the conducting element is directly contacted with a desk surface where the keyboard device is placed. Consequently, the electrostatic charges can be directly discharged to the desktop surface through the ground wire or the conducting element.

Figure 4:
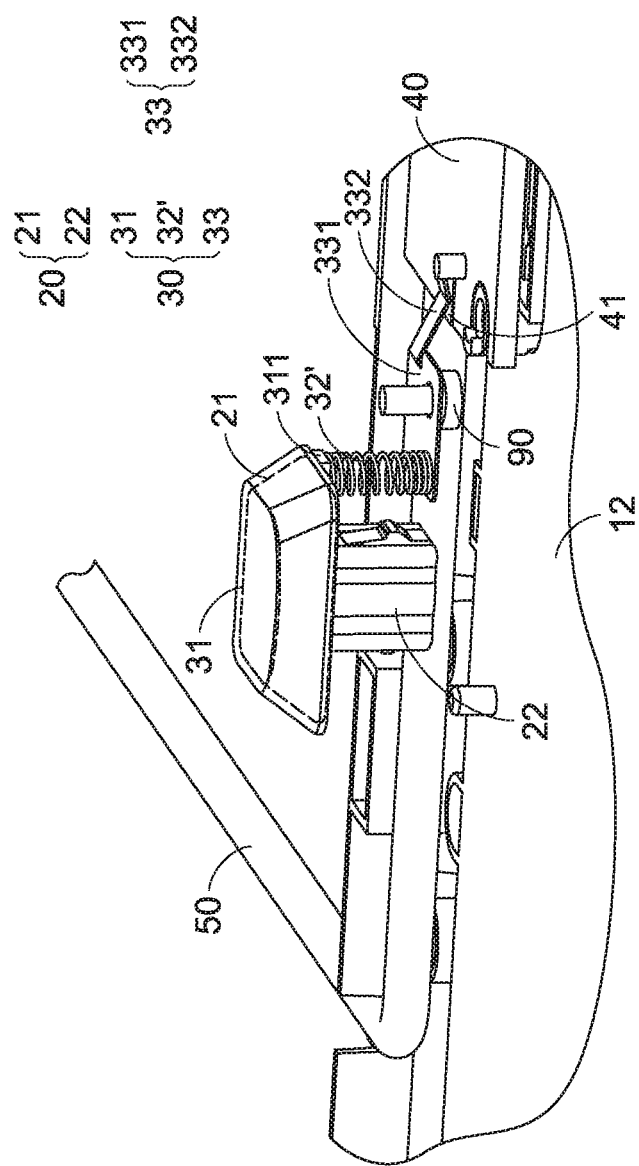
FIG. 4 is a schematic perspective view illustrating the structure of the electrostatic conduction module of the keyboard device according to a second embodiment of the present invention.

Please refer to FIG. 4. FIG. 4 is a schematic perspective view illustrating the structure of the electrostatic conduction module of the keyboard device according to a second embodiment of the present invention. In this embodiment, the electrostatic conduction module 30 comprises a first conductive element 31, a second conductive element 32' and an elastic conductive element 33. The first conductive element 31 and the elastic conductive element 33 of this embodiment are similar to those of the first embodiment, and not redundantly described herein. In comparison with the first embodiment, the second conductive element 32' is distinguished. In this embodiment, the second conductive element 32' is a metallic spring. A first end of the second conductive element 32' (i.e., the metallic spring) is fixed on the surface of the first fixing segment 331 through a spot welding means or an adhering means. A second end of the vertical metal segment 321' is away from the first fixing segment 331. The conductive rib 311 of the first conductive element 31 is connected with the second end of the vertical metal segment 321' through an adhering means, an embedding means, an engaging means or a spot welding means.

While the keycap 21 is pressed down in response to an external force and the first conductive element 31 is correspondingly moved with the keycap 21, the vertical metal segment 321' is compressed by the conductive rib 311 and subjected to elastic compression. When the external force is no longer applied to the keycap 21, the keycap 21 is moved upwardly and returned to its original position. In addition, the second conductive element 32' is elastically stretched and restored to its original uncompressed state. In some embodiments, the elastomer (not shown) installed on a switching circuit board (not shown) of the keyboard device is replaced by the second conductive element 32' (i.e., metallic spring). The second conductive element 32' (i.e., the metallic spring) can provide elastic restoring force to the keycap 21. In response to the elastic restoring force, the keycap 21 is returned to its original position.

From the above descriptions, the present invention provides a keyboard device with an electrostatic discharge protection function. The electrostatic charges on the users' finger or the key can be immediately discharged through the electrostatic conduction module. Due to this structural design, the keyboard device and the electronic device connected with the keyboard device can be effectively protected. Consequently, the electronic components within the keyboard device and the electronic device will not be damaged by the electrostatic charges. In other words, the keyboard device of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device with an electrostatic discharge protection function, the keyboard device comprising:
   a casing comprising plural key slots;
   a circuit board disposed within the casing, and comprising a ground terminal;
   plural keys installed in the corresponding key slots, respectively, wherein each key comprises a keycap and a supporting element, and the keycap is installed on the supporting element; and
   at least one electrostatic conduction module, wherein each of the at least one electrostatic conduction module comprises a first conductive element, an elastic conductive element and a second conductive element, wherein the first conductive element is installed on the keycap, the elastic conductive element is disposed within the casing and contacted with the circuit board, and the second conductive element is connected between the first conductive element and the elastic conductive element,
   wherein the first conductive element is linked with the keycap, and the first conductive element is moveably connected with an end of the second conductive element away from the elastic conductive element, wherein electrostatic charges on the keycap are transferred to the circuit board through the first conductive element, the second conductive element and the elastic conductive element and discharged from the ground terminal of the circuit board.

2. The keyboard device according to claim 1, wherein the first conductive element is a metal lid that is combined with the corresponding keycap, or the first conductive element is a metallic coating that is formed on a surface of the corresponding keycap.

3. The keyboard device according to claim 1, wherein the elastic conductive element comprises a first fixing segment and an elastic extension segment, and the elastic extension segment is connected with the first fixing segment, wherein the first fixing segment is fixed on an inner side of the casing, and the elastic extension segment is contacted with a surface of the circuit board.

4. The keyboard device according to claim 3, wherein the second conductive element comprises a second fixing segment and a vertical metal segment, and the vertical metal segment is connected with the second fixing segment, wherein the vertical metal segment is flexible, and the second fixing segment is combined with the first fixing segment of the elastic conductive element.

5. The keyboard device according to claim 4, wherein the first conductive element comprises a conductive rib, wherein the conductive rib is installed on a lateral side of a skirt part of the keycap, and the conductive rib is connected with an end of the vertical metal segment away from the first fixing segment.

6. The keyboard device according to claim 3, wherein the second conductive element is a metallic spring, and a first end of the metallic spring is fixed on a surface of the first fixing segment.

7. The keyboard device according to claim 6, wherein the first conductive element comprises a conductive rib, wherein the conductive rib is installed on a lateral side of a skirt part of the keycap, and the conductive rib is connected with a second end of the metallic spring away from the first fixing segment.

8. The keyboard device according to claim 1, wherein a power wire is connected with the ground terminal of the circuit board, and the ground terminal is connected to a computer device through the power wire.

9. The keyboard device according to claim 1, wherein the circuit board is a power supply circuit board, a switching circuit board, a backlight circuit board, or a combination thereof.

* * * * *